United States Patent
Paradies et al.

(10) Patent No.: US 9,697,254 B2
(45) Date of Patent: *Jul. 4, 2017

(54) GRAPH TRAVERSAL OPERATOR INSIDE A COLUMN STORE

(71) Applicant: SAP SE, Walldorf (DE)

(72) Inventors: Marcus Paradies, Walldorf (DE);
Michael Rudolf, Heidelberg (DE);
Christof Bornhoevd, Belmont, CA
(US); Wolfgang Lehner, Dresden (DE)

(73) Assignee: SAP SE, Walldorf (DE)

( * ) Notice: Subject to any disclaimer, the term of this patent is extended or adjusted under 35 U.S.C. 154(b) by 199 days.

This patent is subject to a terminal disclaimer.

(21) Appl. No.: 14/634,418

(22) Filed: Feb. 27, 2015

(65) Prior Publication Data

US 2015/0213093 A1   Jul. 30, 2015

Related U.S. Application Data

(63) Continuation of application No. 13/713,872, filed on Dec. 13, 2012, now Pat. No. 8,996,492.

(51) Int. Cl.
*G06F 17/30* (2006.01)

(52) U.S. Cl.
CPC .. *G06F 17/30513* (2013.01); *G06F 17/30315* (2013.01); *G06F 17/30958* (2013.01)

(58) Field of Classification Search
CPC ......... G06F 17/30958; G06F 17/30315; G06F 17/30386
USPC .................................................. 707/705, 798
See application file for complete search history.

(56) References Cited

U.S. PATENT DOCUMENTS

| | | | |
|---|---|---|---|
| 6,633,886 B1 | 10/2003 | Chong | |
| 6,985,890 B2 | 1/2006 | Inokuchi | |
| 8,819,078 B2 | 8/2014 | Roy et al. | |
| 8,996,492 B2 * | 3/2015 | Paradies et al. | 707/705 |

FOREIGN PATENT DOCUMENTS

WO   WO 2011/134086 A1   11/2011

OTHER PUBLICATIONS

Guan, Face Traversal Routing on Edge Dynamic Graphs, Apr. 2005, IEEE, 8 pages.*
Extended European Search Report for EP Application No. 13196991.7, The Hague, Netherlands, mailed Feb. 25, 2014.
Erdogan, K. "A Model to Represent Directed Acyclic Graphs (DAG) on SQL Databases", Code Project, Jan. 14, 2008, www.codeproject.com/Articles/22824/A-Model-to-Represent-Directed_Acyclic-Graphs-DAG-on-SQL-Databases, retrieved Feb. 14, 2014, 16 pages.

(Continued)

*Primary Examiner* — Jean B Fleurantin
(74) *Attorney, Agent, or Firm* — Sterne, Kessler, Goldstein & Fox P.L.L.C.

(57) ABSTRACT

A system, computer-implemented method, and a computer-readable storage medium for a data graph traversal are provided. The input parameters for traversing the data graph are received. The data graph having a set of vertices and a set of edges are stored in a column based format in a memory cache of a computer device based on the input parameters is traversed. The traversal generates a set of traversed vertices that are the result of the graph traversal.

20 Claims, 7 Drawing Sheets

(56) References Cited

OTHER PUBLICATIONS

Halverson A., et al., "A Comparison of C-Store and Row-Store in a Common Framework", Proceedings of the 32$^{nd}$ VLDB Conference, Jan. 1, 2006, http://pages.cs.wisc.edu/~alanh/tr.pdf, retrieved Feb. 14, 2014, 12 pages.
Yaman, S.G., "Introduction to Column-Oriented Database Systems", Seminar: Columnar Databases, Nov. 1, 2012, www.cs.helsinki.fi/webfm_send/1006/Sezin_final.pdf, retrieved Feb. 14, 2012, 6 pages.
Aho, A. et al., "Data Structures and Algorithms, Directed Graphs", Data Structures and Algorithms, Jan. 1, 1983, 32 pages.
Ooerd M., et al., "Data Generation for Testing DAGStructured Bayesian Networks", 2002, IEEE, 6 pages.

\* cited by examiner

| Vsource | Vtarget | E type |
|---------|---------|--------|
| D | B | a |
| F | C | c |
| B | A | a |
| A | C | b |
| E | C | b |
| E | D | b |
| B | C | a |
| F | D | c |

200C

| Vertex | Vid | Attribute 1 | ... | Attribute n |
|--------|-----|-------------|-----|-------------|
| A | Aid | x | | o |
| B | Bid | y | | - |
| C | Cid | j | | m |
| D | Did | - | | v |
| E | Eid | - | | - |
| F | Fid | m | | - |

FIG. 2C

| | | |
|---|---|---|
| \multicolumn{3}{l}{Algorithm 1 Basic Graph Traversal Algorithm} |
| 1: | function TRAVERSE($S$, $P$, $C_{from}$, $C_{to}$) | |
| 2: | | ▷ $S$: Set of Start Vertices |
| 3: | | ▷ $P$: Traversal Description |
| 4: | $E_{vis} \leftarrow \emptyset$ | ▷ $E_{vis}$: Visited Edges |
| 5: | $E_v \leftarrow \emptyset$ | ▷ $E_v$: Valid Edges |
| 6: | $V_s \leftarrow S$ | |
| 7: | $T \leftarrow \emptyset$ | |
| 8: | $step \leftarrow 0$ | |
| 9: | for $i = 1, \ldots, |P|$ do | |
| 10: | $E_v \leftarrow$ Filter $(P_i.pred)$ | ▷ Apply Edge Predicate |
| 11: | if $P_i.direction = Forward$ then | |
| 12: | $C_s = C_{from}; C_t = C_{to};$ | |
| 13: | else | |
| 14: | $C_s = C_{to}; C_t = C_{from};$ | |
| 15: | loop | |
| 16: | $E_{trav} \leftarrow C_s.Scan(V_s, E_v)$ | ▷ $E_{trav}$: Discov. Edges |
| 17: | $E_{vis} \leftarrow E_{vis} \cup E_{trav}$ | |
| 18: | $E_v \leftarrow E_{vis} \oplus E_v$ | ▷ Disable traversed Edges |
| 19: | $V_v \leftarrow C_t.Get(E_{trav})$ | ▷ $V_v$: Visited Vertices |
| 20: | $T \leftarrow T \cup V_v$ | |
| 21: | if $V_v = \emptyset$ then | ▷ All Paths ended |
| 22: | return | |
| 23: | $step \leftarrow step + 1$ | |
| 24: | if $step = P_i.numSteps$ then | ▷ Recursion Boundary |
| 25: | break | |
| 26: | $V_s = V_v$ | |
| 27: | return $T$ | ▷ Return traversed Vertices |

FIG. 3

GRAPH TRAVERSAL OPERATOR INSIDE A COLUMN STORE

CROSS-REFERENCE TO RELATED APPLICATIONS

This application is a continuation of U.S. patent application Ser. No. 13/713,872, filed Dec. 13, 2012, now allowed, which is incorporated herein by reference in its entirety.

BACKGROUND

Field of Invention

This disclosure relates generally to data graph processing and, more specifically, to graph traversals.

Background Art

Data graphs represent data from multiple of domains in an expressive and flexible way. For example, data graphs show relationships between different data objects, and relationships between data objects and properties of these objects. These relationships may be mapped to vertices and edges in the data graph. A graph representation of data is less dependent on a rigid schema common to the relational data and is more suitable for evolving schemas and the ad-hoc integration of data from multiple data sources.

Data graph processing is a tool for processing data. For example, data graph processing is used to analyze social media, semantic web applications and bio-informatics. In these areas, data graph processing identifies and analyzes user relationships in social networks, monitors and manages brand value and company reputation, and analyzes genomics research. Also, data graph processing is used in traditional business processing applications that include business network analysis and optimization, product costing, transportation and distribution analysis, material flow analysis, and product and lifecycle management, to name a few examples.

The advances in the memory-centric data management system that leverage the capabilities of modern hardware, vast memory space, multi-core CPU (central processing unit) and GPU (graphics processing unit) processors provide means for fast and efficient data graph processing. Thus what is needed are system and methods for a fast and efficient, graph traversals that leverage capabilities of a memory-centric database management system having multi-core processors and vast memory.

BRIEF SUMMARY

Disclosed embodiments include a system, method and computer-readable media for traversing a data graph. The input parameters for traversing the data graph are received. The data graph include a set of vertices and a set of edges that are stored in a column based format in a memory of a computer device. The data graph is traversed based on the input parameters. The output is a set of traversed vertices that result from the graph traversal.

Further features and advantages of the disclosed embodiments, as well as the structure and operation of various embodiments, are described in detail below with reference to the accompanying drawings. It is noted that the disclosure is not limited to the specific embodiments described herein. Such embodiments are presented herein for illustrative purposes only. Additional embodiments will be apparent to a person skilled in the relevant art(s) based on the teachings contained herein.

BRIEF DESCRIPTION OF THE DRAWINGS/FIGURES

The accompanying drawings, which, are incorporated herein and form a part of the specification, illustrate contemplated embodiments and, together with the description, further serve to explain the principles of the contemplated embodiments and to enable a person skilled in the relevant art(s) to make and use the contemplated embodiments.

FIG. 2C is an exemplary column-based representation of a vertex table for the data graph.

FIG. 3 is an exemplary algorithm for traversing a data graph using the graph traversal operator.

Figure 1:
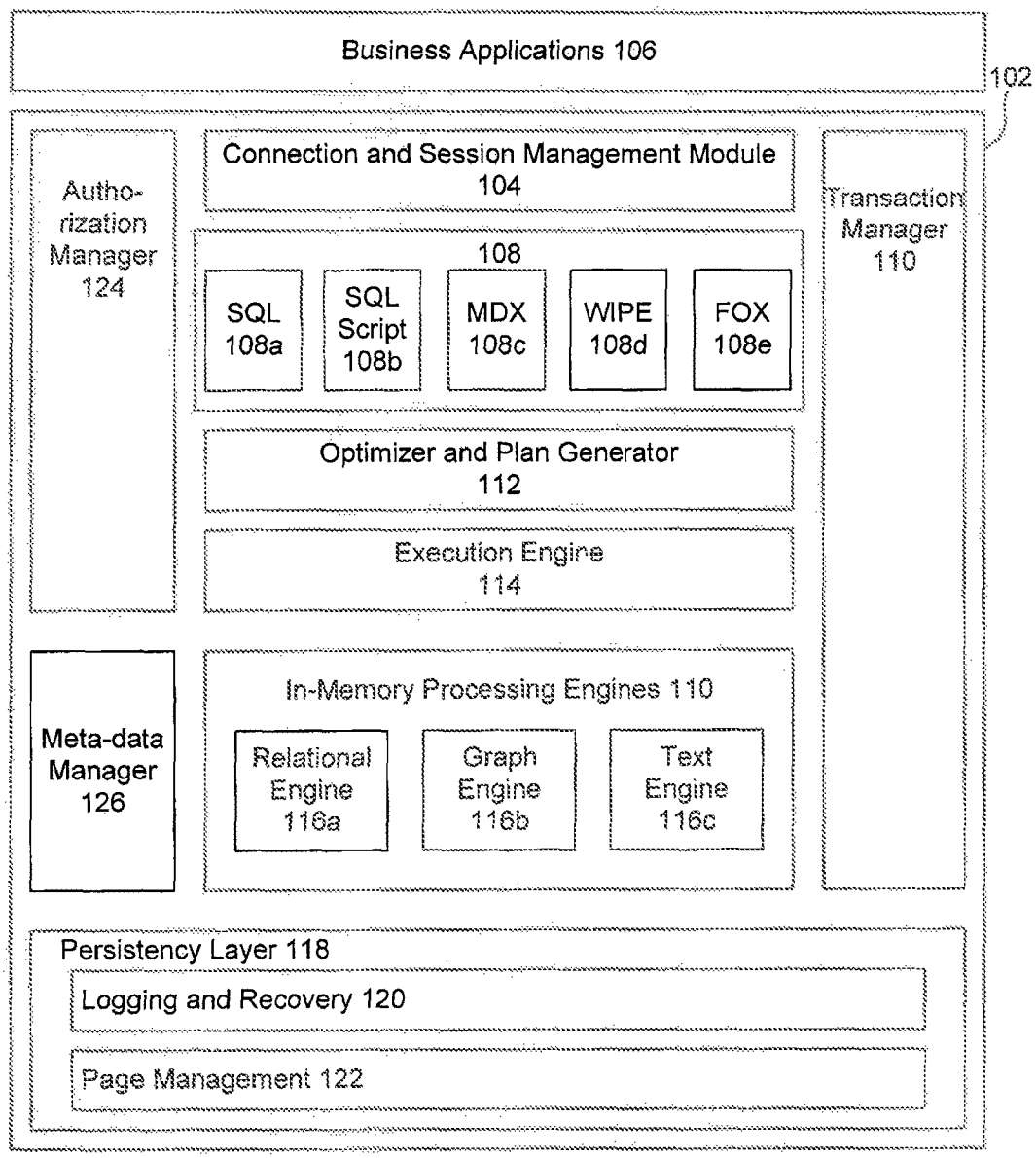
FIG. 1 is a block diagram of an exemplary database system.

The disclosed embodiments will now be described with reference to the accompanying drawings. In the drawings, generally, like reference numbers indicate identical or functionally similar elements. Additionally, generally, the left-most digit(s) of a reference number identifies the drawing in which the reference number first appears.

DETAILED DESCRIPTION

The following detailed description refers to the accompanying drawings that illustrate exemplary embodiments consistent with this disclosure. Other embodiments are possible and contemplated, and modifications can be made to the embodiments within the spirit and scope of the disclosure. Therefore, the detailed description is not meant to limit the scope of the contemplated embodiments. Rather, scope is defined by the appended claims.

Database Management System

FIG. 1 is a block diagram 100 of an exemplary database management system 102. Database management system 102 may be a memory-centric data management system that leverages hardware capabilities, such as vast main memory space, multi core CPUs and GPU processors, and storage device division (SDD) storage.

In an embodiment, database management system 102 includes connection and session management module 104. Connection and session management module 104 creates and manages sessions and connections for database clients. Database clients may be computing devices under a control of a user (also referred to as client devices) that access and/or execute business applications 106. Business applications 106 are custom or generic applications that include applications related to social media, bio-informatics, and business processing, to name a few examples.

Once connection and session management module 104 establishes a session, database clients may use database languages 108, to manipulate data associated with business applications 106. Example database languages 108 include generic database languages, such as, structured query language (SQL) 108$a$, SQL Script 108$b$ (a scripting language for describing application specific calculations inside the database), a MultiDimensional expressions (MDX) 108$c$, and proprietary languages, such as WIPE (for data graph processing) 108d and FOX (for planning applications) 108e, to give a few examples.

In an embodiment, transaction manager 110 ensures that database management system 102 provides ACID (atomicity, consistency, isolation, durability) properties. A person skilled in the art will appreciate that the ACID properties ensure that the database transactions are processed reliably. For example, transaction manager 110 coordinates database transactions, controls transactional isolation, and keeps track of running and closed transactions.

In an embodiment, optimizer and plan generator 112 parses and optimizes client requests that, for example, may be made using database languages 108. For example, optimizer and plan generator 112 may generate an execution plan for executing the client request in database management system 102. Once generated, optimizer and plan generator 112 passes the execution plan to execution engine 114.

In an embodiment, execution engine 114 invokes an in-memory processing engine 116 to process the execution plan. Execution engine 114 may invoke a different in-memory processing engine 116 based on the execution plan type. Example in-memory processing engines 116 include a relational engine 116a, a graph engine 116b and a text engine 116c.

In an embodiment, relational engine 116a processes structured data. Relational engine 116 supports both row- and column-oriented physical representations of relational tables. In an embodiment, column-oriented data is stored in a highly compressed format in order to improve the efficiency of memory resource usage and to speed up the data transfer from disk storage to cache memory or from cache memory to CPU. In an embodiment, a system administrator may specify, at table definition time, whether a new table will be stored in a row- or in a column-oriented format. Row- and column-oriented database tables can be seamlessly combined into one SQL statement, and, subsequently, tables can be moved from one representation form to the other. In an embodiment, a user and application data may be stored in a column-oriented format to benefit from the high compression rate and from the highly optimized access for selection, and aggregation queries. In an embodiment, metadata or data with fewer accesses may be stored in a row-oriented format.

In an embodiment, graph engine 116b and text engine 116c support efficient representation and processing of unstructured data. For example, graph engine 116b processes data graphs. To enable efficient graph access and processing in graph engine 116b, WIPE 108d provides a set of optimized graph operations. In an embodiment, graph engine 116b supports resource planning applications having large numbers of individual resources and complex mash-up interdependencies. Graph engine 116b also supports efficient execution of transformation processes (such as data cleansing in data-warehouse scenarios) and enables the ad-hoc integration of data from different sources.

In an embodiment, text engine 116c provides text indexing and search capabilities. Example text indexing and search capabilities include search for words and phrases, fuzzy search (which tolerates typing errors), and linguistic search (which finds variations of words based on linguistic rules). In addition, text engine 116c ranks search results and supports searching across multiple tables and views.

In an embodiment, persistency layer 118 provides durability and atomicity to transactions. Persistency layer 118 includes a logging and recovery module 120 and a page management module 122. Logging and recovery module 120 logs data, changes in data, and transaction requests to a memory storage disk. Those transactions and data changes may be performed by in-memory processing engines 116, as well as requests issued by multiple client devices.

Page management module 122 provides an interface for writing and reading data from memory cache and disk storage for processing by in-memory processing engines 116.

Persistency layer 118 uses logging and recovery module 120 and page management module 122 to ensure that database management system 102 is restored to the most recent committed state after a restart or system failure. Persistency layer 118 also ensures that transactions are either completely executed or completely undone. To achieve this efficiently, persistency layer 118 uses techniques such as combining write-ahead logs, shadow paging, and savepoints that are known to a person skilled in the relevant art(s).

In an embodiment, database management system 102 includes an authorization manager 124. Authorization manager 124 determines whether a user has the required privileges to execute the requested operations. A privilege grants a right to perform a specified operation (such as create, update, select, or execute). The database management system 102 also supports analytical privileges that represent filters or hierarchy drill-down limitations for analytical queries, as well as control access to values with a certain combination of dimension attributes.

In an embodiment, metadata manager 126 manages metadata in database management system 102. Example metadata includes table definitions, views, indexes, and the definition of SQL script functions.

As discussed above, database management system 102 includes graph engine 116b. Graph engine 116b processes data graphs. To process data graphs, graph engine 116b includes an internal graph application program interface (API) that provides a set of core graph operators. The core operators are the building blocks for graph data query and manipulation languages, such as WIPE. Also, the core operators may be leveraged to implement higher level graph processing algorithms, such as shortest path, nearest neighbor, minimum spanning tree, maximum flow, or transitive closure calculations, to name a few examples.

In database management system 102, a data graph may be represented as a property graph. A property graph is a directed graph where vertices and edges have attributes. An attribute may be defined as a name-value pair. In one embodiment, a vertex attribute may include a unique identifier, and another attribute may represent a semantic type of a connection, to name a few examples.

In an embodiment, database management system 102 stores property graphs as columns of data. Those columns of data may be stored as separate sections of data, rather man consecutive rows that are common in a conventional row-oriented database system. Because data is stored in columns, analytic algorithms, such as aggregation operators, that do not manipulate all columns of a table, can be implemented in a highly performant and cache-efficient way. Additionally, the column data layout is well suited for various light-weight compression techniques.

In an embodiment, data stored in a column-oriented format may be compressed. One way to compress data is to apply a sorted dictionary on the data, where each data value maps to an integer value. By reordering the rows in a table, compression, such as run-length encoding (RLE), sparse encoding, or cluster encoding, may be used. Data compression generates several benefits, such as an increase in the amount of data that can be kept in memory, faster query processing, and accelerated table scans that use SIMD (single instruction, multiple data) instructions on multi-core processors to process compressed data.

Graph Traversal Operator

Figures 2A, 2B:
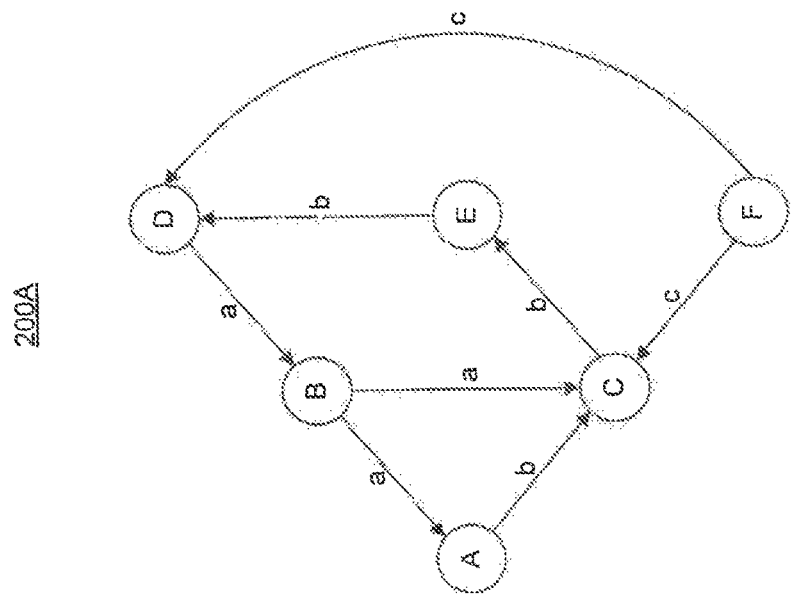
FIG. 2A is an exemplary data graph.
FIG. 2B is an exemplary column-based representation of an edge table data graph.

FIG. 2A is an exemplary data graph 200A. Data graph 200A is a property graph. A property graph may be represented as a directed graph where vertices and edges have attributes. For example, data graph 200A includes six vertices (A-F) and eight edges that have three edge types (a-c). Each of the vertices (A-F) and edges (a-c) may include one or more attributes in, for example, a name-value pair format.

In an embodiment, data graph 200A may be stored in two column-oriented, relationship tables. Attributes on edges and vertices may be stored as additional columns in the tables. Also each edge and vertex in the tables may map to a single database record. Example tables include an edge table that stores edges, as shown in FIG. B and a vertex table that stores vertices as shown in FIG. C.

FIG. 2B is a table 200B of an edge table for data graph 200A. An edge in the edge table of a property graph, such as 200B, may be uniquely identified by a composite key that includes a source vertex, a target vertex, and an edge type. Each edge in the edge table in table 200B includes a composite key that comprises a $V_{source}$ (source vertex), a $V_{target}$ (target vertex) and an $E_{type}$ (edge type). Attributes of the edges (a-c) in data graph 200A may be stored as additional columns of table 200B (not shown).

FIG. 2C is a table 200C of a vertex table for data graph 200A. Table 200C includes vertices A-F, vertex identifiers (Vid) and one or more attributes (shown as A1 . . . An). In an embodiment, each vertex has a unique vertex identifier, as shown in table 200C. As described above, each of the attributes A1 . . . . An in the vertex table may be stored as additional columns in table 200C.

In an embodiment, one of the core operators is a graph traversal operator (also referred to as a GTO). The GTO efficiently traverses a data graph as discussed in detail below. The GTO includes an IO (Input/output) interface. The input interface receives input parameters for input, input parameters may include a set of start vertices and a traversal description, in one embodiment. Input parameters may be received from a client device or other processors in database management system 102.

The graph traversal output generates a set of traversed vertices as output. The set of traversed vertices may be returned to the client device or further used within database management system 102 as input to another operation.

In an embodiment, the GTO is implemented in graph engine 116b. When the GTO executes, the GTO iterates through vertices in a data graph in a breadth-first traversal, although the implementation is not limited to this embodiment, in another embodiment, the breadth-first traversal may be implemented in forward and backward directions, where the forward direction begins at a source vertex and a backward direction begins at a target vertex. During each traversal, the GTO performs a full column scan of a data graph. FIG. 3 is an exemplary algorithm 300 for traversing the data graph using the GTO, and is discussed in detail below.

By way of non-limiting example, algorithm 300 receives a set of start vertices (designated as set S) and a traversal description set (designated as set P) as an input. Each vertex in set S may be represented using a vertex identifier and column references $C_{from}$ and $C_{to}$. Column reference $C_{from}$ stores the source vertices ($V_{source}$), and column reference $C_{to}$ stores the target vertices ($V_{target}$).

A traversal description specifies criteria for traversing the data graph during the graph traversal. A traversal description may be a data set, such as set P. Set P includes an ordered set of path step descriptions. Each path step description is designated as $P_i$, where "i" is an integer from 0 to "n−1", and "n" is a number of path set descriptions in set P. Each $P_i$ may include a recursion boundary which corresponds to the maximum length of paths that are discoverable during the graph traversal. The recursion boundary in algorithm 300 is designated as $P_{i.numsteps}$ for each $P_i$. $P_i$ may also include an edge predicate $P_{i.pred}$. The edge predicate $P_{i.pred}$ is an arbitrary complex relational expression which is evaluated (based on attributes of visited vertices or edges in one example) during the graph traversal associated with $P_i$ to reduce the number of edges that require evaluation.

In an embodiment, each path step description $P_i$ also stores a direction of the traversal in the $P_{i.direction}$ variable. The direction indicates whether the GTO will follow the direction of the edge and perform a scan on the edge table beginning with column $C_{from}$ that corresponds to a source vertex, or against the direction of the edge beginning with column $C_{to}$ that corresponds to a target vertex.

Algorithm 300 begins at line 9 in FIG. 3, where the data graph is traversed according to each path step description $P_i$. First, the edge predicate $P_{i.pred}$ is extracted from the path step description $P_i$. The edge predicate $P_{i.pred}$ is evaluated against the edge table, and generates a set of valid edges $E_v$ from the edge table. The set of valid edges is a reduced set of edges that represents valid records in the database. Example valid records are represented by their position in the column. In an embodiment, the set of valid edges may be represented as an additional data structure, such as a bit vector data structure that facilitates efficient data retrieval.

In an embodiment, once the set of valid edges $E_v$ is identified, the GTO uses the $P_{i.direction}$ variable to extract a direction for scanning columns in the edge table. Referring to algorithm 300, lines 11-14 set the direction for scanning columns in the edge table.

Once a set of valid edges $E_v$ is generated, the GTO begins to scan a set of vertices $V_s$ against the set of valid edges $E_v$. In the first iteration ($P_i$=0), the set of vertices $V_s$ may be set to the set of start vertices (set S). In the subsequent iterations, ($P_i$=1 to n−1), the set of vertices $V_s$ is set to the vertices that were identified in previous iterations (referred to as visited vertices $V_v$ as described below.)

As described above, the direction of the scan may be set using $P_{i.direction}$. When $P_{i.direction}$ is a forward direction, the GTO begins the scan on a $V_{source}$ column in the edge table. The scan generates a set of traversed edges $E_{trav}$. The set of traversed edges $E_{trav}$ are edges that begin from the set of vertices $V_s$. In an embodiment, the GTO returns the set of traversed edges $E_{trav}$ as the set of positions in the edge column.

In an embodiment, the scan is implemented as a hardware-accelerated full column scan that leverages SIMD instructions and data parallelism available on multi-core processors. When the column is stored in a compressed format, graph engine 116b decompresses the columns prior to the scan. During the scan, the GTO uses the set of valid edges $E_v$ to minimize the scan range and to ignore the edges that were previously traversed. The scan generates a set of traversed edges $E_{trav}$ that corresponds to the returned positions in the column. Referring to algorithm 300, line 16 generates the set of traversed edges $E_{trav}$.

Line 16 of algorithm 300 is the first iteration of a loop that the GTO performs to identify a set of traversed vertices T for each path step description $P_i$. The GTO terminates the loop once the termination conditions described below are met.

The set of edges that were visited during the previous traversals with the same or different $P_i$ are stored as a set of visited edges $E_{vis}$. With each traversal iteration the set of traversed edges $E_{trav}$ is merged with the set of visited edges $E_{vis}$. Referring to algorithm 300, line 17 generates the set of visited edges $E_{vis}$.

The GTO uses the set of visited edges $E_{vis}$ to reduce the amount of work during a traversal. In one example, edges in the set of visited edges $E_{vis}$ may be disabled from the set of valid edges $E_v$ to prevent, multiple traversals along previously traversed paths. In another example, the bit vector structures that stores the set of visited edges $E_{vis}$ permits the storing without duplicates. Referring to algorithm 300, line 18 generates the set of visited edges $E_{vis}$ that includes the set of edges without duplicates or edges that may result from multiple traversals.

In an embodiment, the GTO uses the set of traversed edges $E_{trav}$ to retrieve the set of visited vertices $V_v$. The visited vertices $V_v$ are a set of vertices in a vertex target column in the edge table that are reachable from the edges in the set of traversed edges $E_{trav}$. For example, visited vertices $V_v$ are a set of vertices that are reachable from a vertex source column using the set of traversed edges $E_{trav}$. Referring to algorithm 300, line 19 generates the set of visited vertices $V_v$.

In an embodiment, the visited vertices $V_v$ are then added to a set of traversed vertices T. Referring to algorithm 300, line 20 includes the visited vertices $V_v$ in the set of traversed vertices T. The set of traversed vertices T is a compilation of vertices visited during the traversal of all path step description $P_i$ in set P. The set of traversed vertices T is the set of vertices that is returned to a function that invokes the GTO. In an embodiment, the GTO may return the set of vertices T as a set of traversed vertices that are identified by their vertex identifier.

In an embodiment, GTO completes the traversal of each path step description $P_i$ when a terminating condition is met. An example terminating condition for each path step description $P_i$ is when a recursion boundary, indicated by $P_{i.numsteps}$ is reached. Referring to algorithm 300, lines 24-25 demonstrate when the recursion boundary is reached. Another example of a terminating condition is when the set of visited vertices $V_v$ is empty. An empty set of visited vertices $V_v$ indicates that no vertices were reachable from the set of traversed edges $E_{trav}$ either because the vertices do not exist or they were visited in the previous traversals.

Once the GTO reaches a terminating condition for each path step description $P_i$, GTO iterates to the next path step description $(P_{i+1})$ until it iterates through all path step descriptions in set P. Once the GTO iterates through the entire set P, the GTO returns the set of traversed vertices T as its output.

Figure 4:
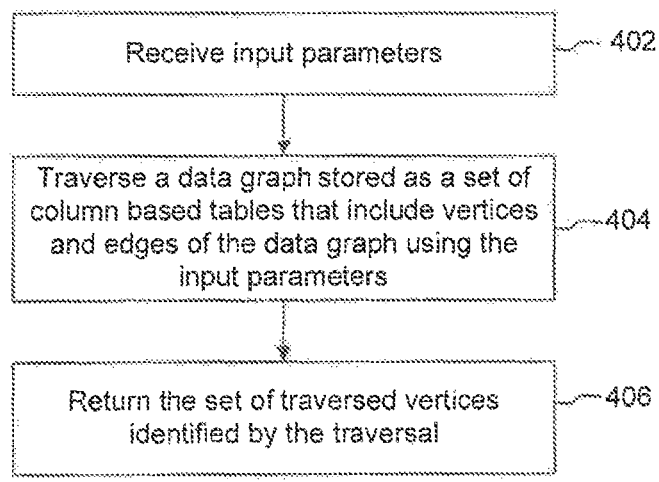
FIG. 4 is a flowchart of a method for traversing a data graph, according to an embodiment.

FIG. 4 is a flowchart 400 of a method for traversing a data graph, according to an embodiment. Prior to the traversal, the data graph is stored in a column-oriented format in a cache memory of the database management system 102. As described above, the data graph may be stored as a set of column-based edge tables and vertex tables.

At step 402, input parameters are received. For example, GTO's IO interface may receive a set of start vertices (set S) and a traversal description, such as path step descriptions set P. As discussed above, each vertex in the set of start vertices S may be identified using a vertex identifier, and column references $C_{from}$ and $C_{to}$ in the edge table. As also described above, the path step descriptions set P includes path step descriptions $P_i$ that set criteria for the graph traversal.

At step 404, the data graph is traversed. For example, the GTO uses the set of start vertices and path step descriptions set P to traverse the column-based tables of the data graph stored in a memory cache of database management system 102. The detailed method for traversing the graph is discussed in FIG. 5, below.

At step 406, the set of traversed vertices is returned. For example, as its output, the GTO returns the set of traversed vertices T to a client device or another function that invoked the GTO.

Figure 5:
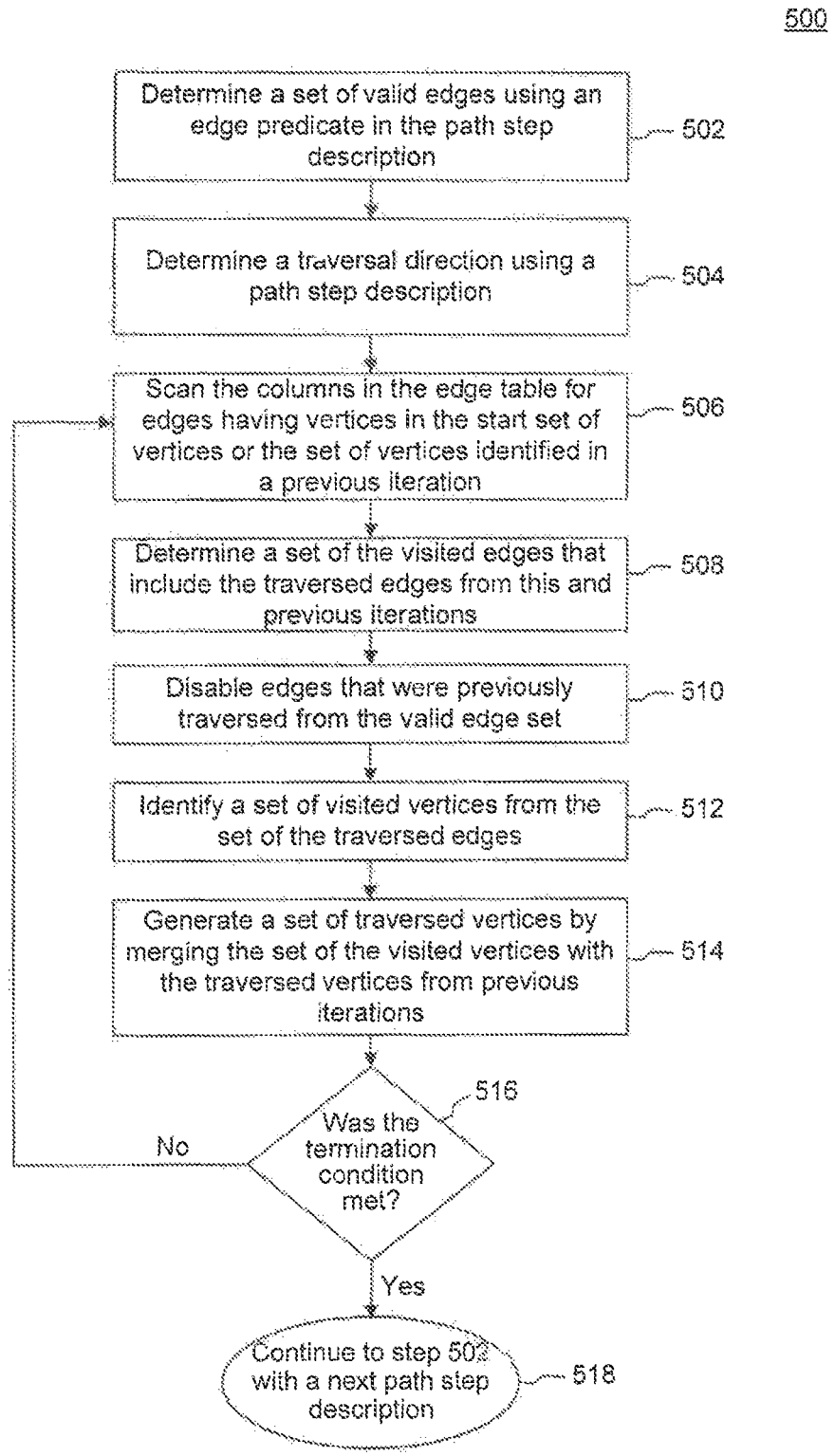
FIG. 5 is a flowchart of a method for traversing a data graph using a path step description, according to an embodiment.

FIG. 5 is a flowchart 500 of a method for traversing a data graph using a path step description, according to an embodiment. The method of flowchart 500 repeats for each path step description $P_i$ in the path step descriptions set P.

At step 502, a set of valid edges is determined. For example, the GTO extracts a path edge predicate $P_{i.pred}$ from a path step description $P_i$. As discussed above, the path edge predicate $P_{i.pred}$ is an arbitrary complex relational expression which is evaluated during the graph traversal to reduce the number of edges that are traversed and evaluated.

At step 504, a traversal direction is determined. For example, the GTO extracts a scan direction stored in a path direction $P_{i.direction}$ of the path step description $P_i$. As described above, the scan direction may be a forward direction, beginning with the source vertex column ($C_{from}$) or a backward direction, beginning with the target vertex column ($C_{to}$).

At step 506, a set of traversed edges is determined. For example, the GTO scans the valid set of vertices $E_v$ stored in the edge table to identify a set of traversed edges $E_{trav}$ in the edge table. The scan on columns in the edge table may be based on the direction selected in step 504. In the first iteration, the GTO scans the set of valid edges $E_v$ for edges that are connected to vertices in the start set of vertices. In the subsequent iterations, the GTO scans the set of vertices $V_s$ that were identified using the set of traversed edges $E_{trav}$ from the previous iteration. As discussed above, step 506 is the first iteration in a loop for identifying the set of traversed vertices T associated with each path step description $P_i$.

At step 508, a set of visited edges is determined. For example, the GTO merges the set of traversed edges $E_{trav}$ with the set of visited edges $E_{vis}$. This causes the set of visited edges $E_{vis}$ to include all edges that were visited during the graph traversal.

At step 510, traversed edges are disabled. For example, the GTO disables the edges that were visited in previous traversals (edges in the set of visited edges $E_{vis}$) from the set of valid edges $E_v$. As described herein, this prevents the GTO from traversing edges more than once during the graph traversal.

At step 512, a set of visited vertices is identified. For example, the GTO identifies the set of visited vertices $V_v$ that are reachable from the set of traversed edges $E_{trav}$.

At step 514, a set of traversed vertices is generated. For example, the GTO generates the set of traversed vertices T by merging the vertices that were identified in previous traversals with the set of visited vertices $V_v$.

At step 516, a determination is made as to whether a termination condition is met. As discussed above, the termination condition terminates the GTO traversal with respect to each path step description $P_i$. The termination condition may be set by $P_{i.numsteps}$ in one embodiment. In another embodiment, the termination condition is met when the set for visited vertices $V_v$ determined in step 512 is empty. If the termination condition was not met, the flowchart proceeds to step 506. Otherwise, the flowchart proceeds to step 502 with the next path step description $P_{i+1}$.

When the GTO iterates through the path step description set P, the GTO returns the set of traversed vertices T as its output parameter.

As the GTO generates a set of traversed vertices T, GTO uses the topology of the data graph to optimize the traversal. Example optimizations may include a graph-level optimization, a path-level optimization, and a neighbor-level optimization. In one embodiment, the GTO performs graph optimization on large graphs that, for example, include more than two million nodes.

Graph Level Optimization

A graph level optimization generates sub graphs from a data graph. Each of those sub graphs may be analyzed individually using the GTO. For example, multi-relational graphs may have multiple edge types, where each edge type represents a relationship between the graph nodes.

In an embodiment, each edge type may be treated as a predicate. When a sub graph that uses the edge type as a predicate is generated, the sub graph consists of all vertices that are connected with the particular edge type. This causes a data graph that comprises N different, edge types to be subdivided into N different sub graphs. In an embodiment, each sub graph may be stored in the area in the column that contains all edges forming the sub graph.

For example, the data graph in FIG. 2A includes three edge types: edge type "a", "b", and "c." To optimize die data graph in FIG. 2A, the GTO divides the data graph into three sub graphs, according to the edge type. The first sub graph includes nodes A, B, C and D that are connected by edge type "a". The second sub graph includes nodes A, C, E and D that are connected by edge type "b". The third sub graph includes nodes C, F and D that are connected by edge type "c".

During the scan operation described above, the GTO scans each sub graph independently of other sub graphs. In an embodiment, the GTO scans the sub graphs according to the scan range indicated by the edge type. Because each sub graph is scanned independently, the sub graphs may be scanned in parallel using multi-core processors in database management system 102.

In an embodiment, if an edge predicate contains a disjunctive condition, for example, the traversal only over edges of type "a" or "b", the GTO splits the scan operation into two independent scans according to the "a" edge type and "b" edge type. The sub graph that includes nodes connected by edge type "c" does not need to be processed at all. The GTO then joins the partial results after the traversal completes.

Path Level Optimization

A path level optimization reorganizes the layout of the data graph that preserves the graph topology. The reorganized data graph is optimized for efficient traversals of large graphs.

In an embodiment, a data graph may be reordered as follows:

Let $V=\{v_1, \ldots v_n\}$ be a set of vertices of the directed acyclic data graph D. A topological ordering maps each vertex $v_i$ to an ordinal $ord(v_i)$ such that for edge $(v_i, v_j)$ in the data graph D the condition $ord(v_i)<ord(v_j)$ is true, wherein "i", "j" and "n" are positive integers with "i" and "j" less than "n". Thus the location of the edges in the edge table is reordered to satisfy the above condition.

The knowledge of edge ordering and a physical topology of the columns allows refining and restricting column scans to certain areas of the graph. When scans are restricted to certain areas of the graph, more scans can be performed in parallel on multi-core processors, where each scan is restricted to a particular range in the column.

One way to restrict column scans is according to a predefined range. In one embodiment, the range may include sections of the columns that include reachable vertices from a determined set of edges. Typically, for each path step $P_i$, a number of vertices to consider during each loop iteration decreases, because either they have already been discovered or because they are not reachable from the traversed set of edges $E_{trav}$.

Thus, a range may restrict column scans to the areas of the column that may include traversed vertices. For example, a range R may be an ordered pair (a, b) of non-negative numbers "a" and "b" where a≤b. The range boundaries "a" and "b" are actual positions in a column.

When range R is applied to each vertex $v_i$, a column is divided into two disjunctive ranges, the skip range $R(v_i)$ (skip) and the accessibility range $R(v_i)(acc)$. The skip range $R(v_i)(skip)$ includes all vertices $v_j$ whose ordering number $ord(v_j)$ is greater than or equal to $ord(v_i)$. Thus the skip range $R(v_i)(skip)$ includes the set of vertices that are not reachable from vertex $v_i$. In other words, there is no connecting path between vertex $v_i$ and vertices in range $R(v_i)(skip)$.

The accessibility range $R(v_i)(acc)$ refers to the set of vertices that are potentially reachable from context vertex $v_i$. In other words, there may be a connecting path between vertex $v_i$, and vertex $v_j$ in the range $R(v_i)(acc)$.

When the GTO performs a scan on a vertex $v_i$, it scans the vertices in the range $R(v_i)(acc)$ because the range may yield traversed vertices. The GTO, however, skips the scan of vertices in the range $R(v_i)(skip)$ because the graph topology indicates that no vertices connected to vertex $v_i$ exist in the range $R(v_i)(skip)$.

Neighbor Level Optimization

A neighbor level optimization adds support for efficient execution of neighboring queries. Neighboring queries are graph traversals that execute only one path step away and return a set of neighboring vertices for a given vertex or a set of vertices. One way to ensure neighbor level optimization is to group edges by their source vertex. This edge clustering may be exploited during the retrieval operations (line 19 in algorithm 300) and the scan operation (line 16 in algorithm 300). Edge clustering ensures spatial locality in memory for edges sharing the same start vertex. For example, edges sharing the same vertex are written consecutively in memory.

A person skilled in the art will appreciate, that retrieval of desired data from cache memory causes a retrieval of a memory block that includes the desired data. In the memory block, there may be other data that is unrelated to the desired data. When edges sharing the same vertex are written consecutively into memory, the likelihood that the edges are written into the same memory block is maximized. Thus, when the scan or retrieval operation in the GTO retrieves edges or vertices from a particular memory block, there is the likelihood that the same memory block will also include edges or vertices that will be required by subsequent queries. This reduces unnecessary memory block retrievals from memory which further optimize the performance of the GTO.

Computer System

Figure 6:
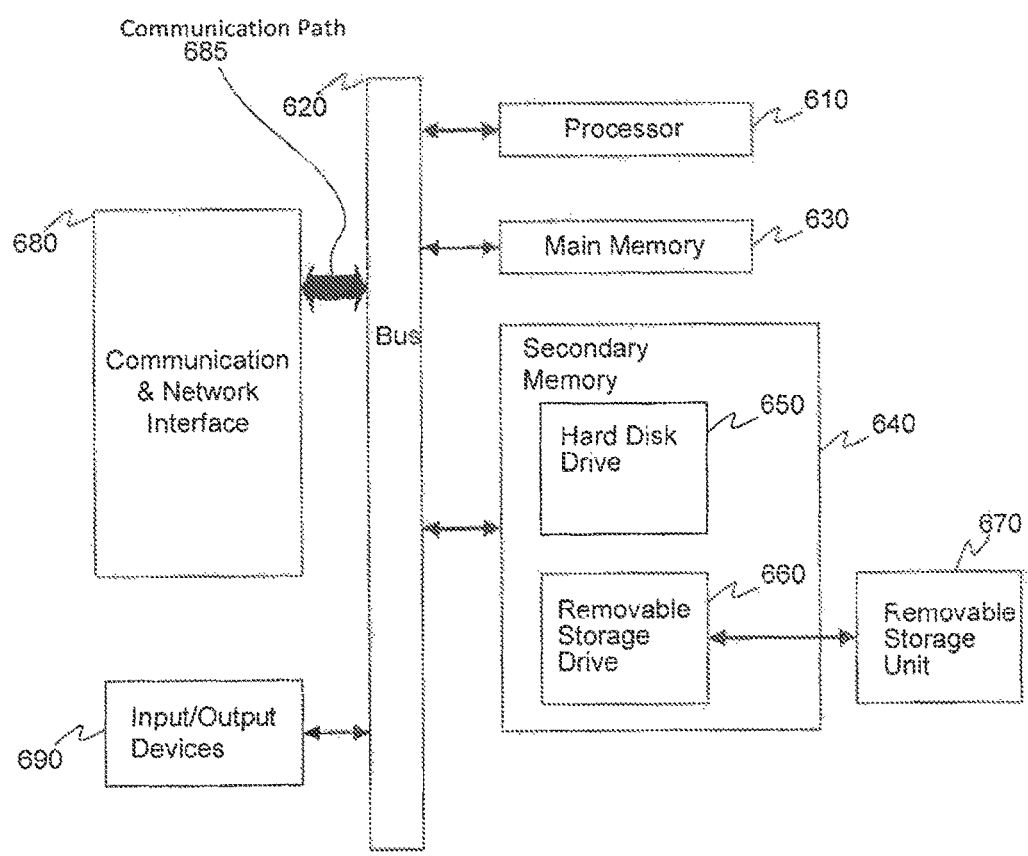
FIG. 6 is an exemplary computing device where the contemplated embodiments can be implemented.

Various aspects of the disclosure can be implemented by software, firmware, hardware, or a combination thereof. FIG. 6 illustrates an example computer system 600 in which the contemplated embodiments, or portions thereof, can be implemented as computer-readable code. For example, the methods illustrated by flowcharts described herein can be implemented in system 600. Various embodiments are described in terms of this example computer system 600. After reading this description, it will become apparent to a person skilled in the relevant art how to implement the embodiments using other computer systems and/or computer architectures.

Computer system 600 includes one or more processors, such as processor 610. Processor 610 can be a special, purpose or a general purpose processor. Processor 610 is connected to a communication infrastructure 620 (for example, a bus or network).

Computer system 600 also includes a main memory 630, preferably random access memory (RAM), and may also include a secondary memory 640. Secondary memory 640 may include, for example, a hard disk drive 650, a removable storage drive 660, and/or a memory stick. Removable storage drive 660 may comprise a floppy disk drive, a magnetic tape drive, an optical disk drive, a flash memory, or the like. The removable storage drive 660 reads from and/or writes to a removable storage unit 670 in a well-known manner. Removable storage unit 670 may comprise a floppy disk, magnetic tape, optical disk, etc. which is read by and written to by removable storage drive 660. As will be appreciated by persons skilled in the relevant art(s), removable storage unit 670 includes a computer usable storage medium having stored therein computer software and/or data.

In alternative implementations, secondary memory 640 may include other similar means for allowing computer programs or other instructions to be loaded into computer system 600. Such means may include, for example, a removable storage unit 670 and an interface (not shown). Examples of such means may include a program cartridge and cartridge interface (such as that found in video game devices), a removable memory chip (such as an EPROM, or PROM) and associated socket, and other removable storage units 670 and interfaces which allow software and data to be transferred from the removable storage unit 670 to computer system 600.

Computer system 600 may also include a communications and network interface 680. Communication and network interface 680 allows software and data to be transferred between computer system 600 and external devices. Communications and network interface 680 may include a modem, a communications port, a PCMCIA slot and card, or the like. Software and data transferred via communications and network interface 680 are in the form of signals which may be electronic, electromagnetic, optical, or other signals capable of being received by communication and network interface 680. These signals are provided to communication and network interface 680 via a communication path 685. Communication path 685 carries signals and may be implemented using wire or cable, fiber optics, a phone line, a cellular phone link, an RF link or other communications channels.

The communication and network interface 680 allows the computer system 600 to communicate over communication networks or mediums such as LANs, WANs the Internet, etc. The communication and network interface 680 may interface with remote sites or networks via wired or wireless connections.

In this document, the terms "computer program medium" and "computer usable medium" and "computer readable medium" are used to generally refer to media such as removable storage unit 670, removable storage drive 660, and a hard disk installed in hard disk drive 650. Signals carried over communication path 685 can also embody the logic described herein. Computer program medium and computer usable medium can also refer to memories, such as main memory 630 and secondary memory 640, which can be memory semiconductors (e.g. DRAMs, etc.). These computer program products are means for providing software to computer system 600.

Computer programs (also called computer control logic) are stored in main memory 630 and/or secondary memory 640. Computer programs may also be received via communication and network interface 680. Such computer programs, when executed, enable computer system 600 to implement embodiments as discussed herein. In particular, the computer programs, when executed, enable processor 610 to implement the disclosed processes, such as the steps in the methods illustrated by flowcharts discussed above. Accordingly, such computer programs represent controllers of the computer system 600. Where the embodiments are implemented using software, the software may be stored in a computer program product and loaded into computer system 600 using removable storage drive 660, interfaces, hard drive 650 or communication and network interface 680, for example.

The computer system 600 may also include input/output/display devices 690, such as keyboards, monitors, pointing devices, etc.

The embodiments are also directed to computer program products comprising software stored on any computer useable medium. Such software, when executed in one or more data processing device(s), causes a data processing device(s) to operate as described herein. Embodiments employ any computer useable or readable medium, known now or in the future. Examples of computer useable mediums include, but are not limited to primary storage devices (e.g., any type of random access memory), secondary storage devices (e.g., hard drives, floppy disks, CD ROMS, ZIP disks, tapes, magnetic storage devices, optical storage devices, MEMS, nanotechnological storage device, etc.), and communication mediums (e.g., wired and wireless communications networks, local area networks, wide area networks, intranets, etc.).

The contemplated embodiments can work with software, hardware, and/or operating system implementations other than those described herein. Any software, hardware, and operating system implementations suitable for performing the functions described herein can be used.

It is to be appreciated that the Detailed Description section, and not the Summary and Abstract sections, is intended to be used to interpret the claims. The Summary and Abstract sections may set forth one or more but not all exemplary embodiments as contemplated by the inventor(s), and thus, are not intended to limit the scope of the disclosure, contemplated embodiments, and the appended claims in any way.

The disclosure has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the disclosed and contemplated embodiments that others can, by applying knowledge within the skill of the art, readily modify and/or adapt for various applications such specific embodiments, without undue experimentation, without departing from the general concept of the disclosure. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the specification is to be interpreted by the skilled artisan in light of the teachings and guidance.

The breadth and scope of the disclosure should not be limited by any of the above-described exemplary embodiments, but should be defined only in accordance with the following claims and their equivalents.

What is claimed is:

1. A computer-implemented method for improved graph traversal in a memory-centric database, comprising:
    receiving, by at least one processor, an input parameter, wherein the input parameter includes a set of path step descriptions;
    recursively traversing an edge table for a data graph, wherein the edge table is a column oriented table in the memory-centric database, and the traversing identifies a set of traversed vertices and further comprises:
        selecting a path step description from the set of path step descriptions;
        extracting a path predicate from the selected path step description;
        evaluating the extracted path predicate against the edge table, wherein the evaluation generates a set of valid edges, and the set of valid edges reduces a scan range during traversing;
        determining a direction for scanning the set of valid edges based on the selected path step description; and
        generating the set of traversed vertices by scanning the set of valid edges using the determined direction; and
    returning the set of traversed vertices, wherein the set of traversed vertices are a set of vertices visited during the traversing.

2. The method of claim 1, wherein at least one terminating condition is specified in the selected path step description.

3. The method of claim 1, wherein at least one terminating condition is met when no vertices were identified during the scanning with a previous path step description.

4. The method of claim 1, wherein evaluating the extracted path predicate against the edge table further comprises:
    generating a set of traversed edges by scanning the set of vertices and the set of valid edges in the edge table;
    eliminating the set of traversed edges from the set of the valid edges;
    generating a set of visited vertices from the set of the traversed edges; and
    merging the set of visited vertices into the set of traversed vertices, wherein the set of traversed vertices includes vertices from multiple path step descriptions.

5. The method of claim 1, further comprising optimizing the traversing, wherein the optimizing comprises:
    identifying edge types in the data graph;
    generating a plurality of sub graphs, wherein a sub graph in the plurality of sub graphs is associated with an edge type included in the edge types; and
    traversing the plurality of sub graphs in parallel to determine the set of traversed vertices.

6. The method of claim 1, further comprising optimizing the traversing, wherein the optimizing comprises:
    determining a topological ordering for a vertex in a set of vertices in the data graph;
    for the vertex, identifying a subset of vertices that includes vertices reachable from the vertex based on the topological ordering; and
    rearranging the edges in the edge table based on the subset of vertices, such that the edges associated with the subset of vertices are traversed during the traversing.

7. The method of claim 1, further comprising optimizing the traversing, wherein the optimizing further comprises:
    determining a subset of vertices that includes vertices a predetermined path step away from a vertex; and
    storing the determined subset of vertices in a location in memory, such that the subset of vertices and the vertex are retrieved using a request for a single memory block during the traversing.

8. A system, comprising:
    a graph traversal operator stored in memory and executing on a processor and causes the processor to:
        receive an input parameter, wherein the input parameter includes a set of path step descriptions;
        recursively traverse an edge table for a data graph, wherein the edge table is stored in a column oriented table in a memory-centric database, and the traversing identifies a set of traversed vertices and to traverse the edge table the graph traversal operator is further configured to:
            selecting a path step description from the set of path step descriptions;
            extracting a path predicate from the selected path step description;
            evaluate the extracted path predicate against the edge table, wherein the evaluation generates a set of valid edges, and the set of valid edges reduces a scan range during traversing;
            determine a direction for scanning the set of valid edges based on the selected path step description; and
            generate the set of traversed vertices by scanning the set of valid edges using the determined direction; and
        return the set of traversed vertices, wherein the set of traversed vertices are a set of vertices visited during the traversing.

9. The system of claim 8, wherein at least one terminating condition is specified in the selected path step description.

10. The system of claim 8, wherein at least one terminating condition is met when no vertices were identified during the scanning with a previous path step description.

11. The system of claim 8, wherein to evaluate the extracted path predicate against the edge table is further configured to:
    generate a set of traversed edges by scanning the set of vertices and the set of valid edges in the edge table;
    eliminate the set of traversed edges from the set of the valid edges;
    generate a set of visited vertices from the set of the traversed edges; and
    merge the set of visited vertices into the set of traversed vertices, wherein the set of traversed vertices includes vertices from multiple path step descriptions.

12. The system of claim 8, further comprising an optimization module configured to optimize the traversal and configured to:
    identify edge types in the data graph;

generate a plurality of sub graphs, wherein a sub graph in the plurality of sub graphs is associated with an edge type included in the edge types; and traverse the plurality of sub graphs in parallel to determine the set of traversed vertices.

13. The system of claim 8, further comprising an optimization module configured to optimize the traversal and configured to:

determine a topological ordering for a vertex in a set of vertices in the data graph;

for the vertex, identify a subset of vertices that includes vertices reachable from the vertex based on the topological ordering; and rearrange the edges in the edge table based on the subset of vertices, such that the edges associated with the subset of vertices are traversed during the traversal.

14. The system of claim 8, further comprising an optimization module configured to optimize the traversal and configured to:

determine a subset of vertices that includes vertices a predetermined path step away from a vertex; and store the determined subset of vertices in a location in memory, such that the subset of vertices and the vertex are retrieved using a request for a single memory block during the traversal.

15. A tangible computer-readable device having instructions stored thereon that, when executed by at least one computing device, causes the at least one computing device to perform operations, comprising:

receiving an input parameter, wherein the input parameter includes a set of path step descriptions;

recursively traversing an edge table for a data graph, wherein the edge table is a column oriented table in a memory-centric database, and the traversing identifies a set of traversed vertices and further comprises:

selecting path step description from the set of path step descriptions;

extracting a path predicate from the selected path step description;

evaluating extracted path predicate against the edge table, wherein the evaluation generates a set of valid edges, and the set of valid edges reduces a scan range during traversing;

determining a direction for scanning the set of valid edges based on the selected path step description; and generating the set of traversed vertices by scanning the set of valid edges using the determined direction; and returning the set of traversed vertices, wherein the set of traversed vertices are a set of vertices visited during the traversing.

16. The computer-readable device of claim 15, wherein at least one terminating condition is specified in the selected path step description.

17. The computer-readable device of claim 15, the evaluating comprising:

generating a set of traversed edges by scanning the set of vertices and the set of valid edges in the edge table;

eliminating the set of traversed edges from the set of the valid edges;

generating a set of visited vertices from the set of the traversed edges; and merging the set of visited vertices into the set of traversed vertices, wherein the set of traversed vertices includes vertices from multiple path step descriptions.

18. The computer-readable device of claim 15, wherein the operations further comprise:

identifying edge types in the data graph;

generating a plurality of sub graphs, wherein a sub graph in the plurality of sub graphs is associated with an edge type included in the edge types; and traversing the plurality of sub graphs in parallel to determine the set of traversed vertices.

19. The computer-readable device of claim 15, wherein the operations further comprise:

determining a topological ordering for a vertex in a set of vertices in the data graph;

for the vertex, identifying a subset of vertices that includes vertices reachable from the vertex based on the topological ordering; and rearranging the edges in the edge table based on the subset of vertices, such at the edges associated with the subset of vertices are traversed during the traversal.

20. The computer-readable device of claim 15, wherein the operations further comprise:

determining a subset of vertices that includes vertices a predetermined path step away from a vertex; and storing the determined subset of vertices in a location in memory, such that the subset of vertices and the vertex are retrieved using a request for a single memory block during the traversal.

\* \* \* \* \*